United States Patent
Zhang et al.

(10) Patent No.: US 9,672,636 B2
(45) Date of Patent: Jun. 6, 2017

(54) TEXTURE MASKING FOR VIDEO QUALITY MEASUREMENT

(75) Inventors: Fan Zhang, Beijing (CN); Kai Xie, Beijing (CN); Wenfei Jiang, Beijing (CN); Zhibo Chen, Beijing (CN)

(73) Assignee: Thomson Licensing, Issy les Moulineaux (FR)

(*) Notice: Subject to any disclaimer, the term of this patent is extended or adjusted under 35 U.S.C. 154(b) by 0 days.

(21) Appl. No.: 14/358,289

(22) PCT Filed: Apr. 23, 2012

(86) PCT No.: PCT/CN2012/074522
§ 371 (c)(1),
(2), (4) Date: May 15, 2014

(87) PCT Pub. No.: WO2013/078822
PCT Pub. Date: Jun. 6, 2013

(65) Prior Publication Data
US 2014/0301649 A1    Oct. 9, 2014

(30) Foreign Application Priority Data

Nov. 29, 2011   (WO) ................ PCT/CN2011/083154

(51) Int. Cl.
*G06T 7/40*    (2017.01)
*G06T 7/00*    (2017.01)
(Continued)

(52) U.S. Cl.
CPC .............. *G06T 7/40* (2013.01); *G06T 7/0002* (2013.01); *G06T 7/13* (2017.01); *G06T 7/44* (2017.01);
(Continued)

(58) Field of Classification Search
None
See application file for complete search history.

(56) References Cited

U.S. PATENT DOCUMENTS

| 5,003,618 A | 3/1991 | Meno |
| 6,101,285 A | 8/2000 | Fan |

(Continued)

FOREIGN PATENT DOCUMENTS

| CN | 101911716 | 12/2010 |
| CN | 102104730 A | 6/2011 |

(Continued)

OTHER PUBLICATIONS

Q. Liu, J. Luo, Y. Zhu Adaptive image decomposition by improved bilateral filter International Journal of Computer Applications, 23 (7) (2011), pp. 16-22 accessed on Oct. 30, 2015 at <http: http://citeseerx.ist.psu.edu/viewdoc/download?doi=10.1.1.259.2791 &rep=rep1 &type=pdf>.*

(Continued)

*Primary Examiner* — Siamak Harandi
*Assistant Examiner* — Kate R Duffy
(74) *Attorney, Agent, or Firm* — Brian J. Dorini; Xiaoan Lu

(57) ABSTRACT

A particular implementation decomposes an image into a structure component and a texture component. An edge strength map is calculated for the structure component, and a texture strength map is calculated for the texture component. Using the edge strength and the texture strength, texture masking weights are calculated. The stronger the texture strength is, or the weaker the edge strength is, the more distortion can be tolerated by human eyes, and thus, the smaller the texture masking weight is. The local distortions are then weighted by the texture masking weights to generate an overall distortion level or an overall quality metric.

9 Claims, 7 Drawing Sheets

(51) Int. Cl.

| | | |
|---|---|---|
| *H04N 19/154* | (2014.01) | |
| *H04N 19/172* | (2014.01) | |
| *H04N 19/117* | (2014.01) | |
| *H04N 19/14* | (2014.01) | |
| *H04N 19/86* | (2014.01) | |
| *G06T 7/13* | (2017.01) | |
| *G06T 7/44* | (2017.01) | |
| *H04N 19/162* | (2014.01) | |

(52) U.S. Cl.
CPC ........... *H04N 19/117* (2014.11); *H04N 19/14* (2014.11); *H04N 19/154* (2014.11); *H04N 19/172* (2014.11); *H04N 19/865* (2014.11); *G06T 2207/10016* (2013.01); *G06T 2207/20028* (2013.01); *G06T 2207/30168* (2013.01); *H04N 19/162* (2014.11)

(56) References Cited

U.S. PATENT DOCUMENTS

| | | | |
|---|---|---|---|
| 2001/0039556 | A1 | 11/2001 | Aoki et al. |
| 2004/0136562 | A1 | 7/2004 | Sarraf et al. |
| 2008/0260278 | A1* | 10/2008 | Zuo ................... H04N 19/176 382/251 |
| 2009/0147853 | A1 | 6/2009 | Dane et al. |
| 2011/0085743 | A1 | 4/2011 | Lei et al. |
| 2011/0150353 | A1 | 6/2011 | Watanabe et al. |
| 2011/0158541 | A1 | 6/2011 | Watanabe |
| 2012/0020415 | A1 | 1/2012 | Yang et al. |
| 2013/0223734 | A1* | 8/2013 | Tuzel ................... G06T 3/4053 382/167 |

FOREIGN PATENT DOCUMENTS

| | | |
|---|---|---|
| CN | 102110287 A | 6/2011 |
| EP | 1672586 | 6/2006 |
| EP | 1672587 | 6/2006 |
| JP | 2008278185 | 11/2008 |
| JP | 2011507404 | 3/2011 |
| JP | 2011510562 | 3/2011 |
| JP | 2011134204 | 7/2011 |
| RU | 2006131032 | 3/2008 |
| RU | 2411584 | 2/2011 |
| RU | 2001132755 | 3/2011 |

OTHER PUBLICATIONS

Anmin Liu; Weisi Lin; Paul, M.; Chenwei Deng; Fan Zhang, "Just Noticeable Difference for Images With Decomposition Model for Separating Edge and Textured Regions," in Circuits and Systems for Video Technology, IEEE Transactions on , vol. 20, No. 11, pp. 1648-1652, Nov. 2010. Accessed on Oct. 30, 2015 <http://ieeexplore.ieee.org/stamp/stamp.jsp?tp=&arnu.*
Zhang et al., Image Decomposition and Texture Segmentation via Sparse Representation, IEEE Signal Processing Letters, vol. 15, 2008, pp. 641-644.
Liu et al., Just Noticeable Difference for Images with Decomposition Model for Separating Edge and Textured Regions, IEEE Transactions on Circuits and Systems for Video Technology, vol. 20, No. 11, Nov. 2010, pp. 1648-1652.
Tomasi et al., "Bilateral Filtering for Gray and Color Images", Proceedings of the 1998 IEEE International Conference on Computer Vision, Bombay, India, pp. 836-846.
Liu et al., "A Simplified Human Vision Model Applied to a Blocking Artifact Metric", Dept. of Mediamatics, Delft University of Technology, Delft, The Netherlands, Group Visual Experiences, Philips Research Labs, Eindhoven, The Netherlands, CAIP 2007, LNCS 4673, pp. 334-341, 2007.
PCT International Search Report mailed Sep. 13, 2012.
Sylvain Paris et al: "A Fast Approximation of the Bilateral Filter Using a Signal Processing Approach", Jan. 1, 2006 (Jan. 1, 2006), Computer Vision—ECCV 2006 Lecture Notes in Computer Science;;LNCS, Springer, Berlin,DE, pp. 568-580, XP019036567,ISBN: 978-3-540-33838-3* Introduction, first paragraph*.
Fan Zhang et al: "Practical Image Quality Metric Applied to Image Coding",IEEE Transactions on Multimedia, IEEESERVICE Center, Piscataway, NJ, US,vol. 13, No. 4, Aug. 1, 2011 (Aug. 1, 2011), pp. 515-624, XP011479803,ISSN: 1520-9210, DOI:10.1109/TMM. 2011.2134079* abstract ** Section III*.
Yang et al.: "Motion-Compensated Residue Preprocessing in Video Coding Based on Just-Noticeable-Distortion Profile." IEEE Actions on circuits and systems for video technology, vol. 15, No. 6, Jun. 2005, pp. 742-752.

* cited by examiner

TEXTURE MASKING FOR VIDEO QUALITY MEASUREMENT

CROSS-REFERENCE TO RELATED APPLICATIONS

This application claims the benefit, under 35 U.S.C. §365 of International Application PCT/CN2012/074522 and filed Apr. 23, 2012, which was published in accordance with PCT Article 21(2) on Jun. 6, 2013, in English, and which claims the benefit of International Application PCT/CN2011/083154, filed Nov. 29, 2011, in English, which are incorporated by reference in their respective entireties.

TECHNICAL FIELD

This invention relates to video quality measurement, and more particularly, to a method and apparatus for determining a video quality measure in response to the texture masking property of the human visual system.

BACKGROUND

Video quality metrics may be used in video coding, network scheduling and multimedia service recommendation. Generally, the more textured the video content is, the more artifacts in the video content can be tolerated by human eyes. That is, when a video content is viewed by human eyes, visual artifacts may be masked by the video content itself. This property of human eyes is known as texture masking property.

SUMMARY

According to a general aspect, image data having at least one image region are accessed. The image region is decomposed into a structure component and a texture component. An edge strength is determined for the structure component in the image region, and a texture masking weight is determined in response to the edge strength in the image region. A quality metric is then determined in response to the texture masking weight.

According to another general aspect, image data having a plurality of image regions are accessed. The image data is decomposed into a structure component and a texture component. An edge strength is determined for the structure component in each image region, and a texture masking weight is determined in response to the edge strength in each image region. A quality metric is determined in response to a weighted combination of local distortions, the local distortions being weighted by the texture masking weights.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Figure 1A:
FIG. 1A is a pictorial example depicting a picture.

Video quality metrics may be used in video coding, network scheduling and multimedia service recommendation. Depending on the availability of the reference video, a video quality metric can be categorized as a full-reference metric or a no-reference metric. For a full-reference quality metric, the difference between the reference and the impaired image/video may be a key factor to affect the visual quality. For a no-reference quality metric, configuration parameters, such as the quantization parameter (QP) or the block error rate may be a key factor.

In addition to the key factor, the texture masking property of the human visual system also affects the perceived visual quality. Therefore, the texture masking property is often simulated when designing video quality metrics. For example, a region in a picture may be regarded as a textured area where the visual artifacts may be masked, and may be considered to have less impact on the perceived video quality. In another example, a region in the picture may be regarded as a non-textured area (for example, a smooth area or an area with edge) and may be considered to have more impact on perceived visual quality.

In order to exploit the texture masking property, a region in a picture needs to be identified as a textured region or a non-textured region. A region is referred to as a textured region if it contains detailed and/or irregular patterns. Otherwise, it is referred to as a non-textured region, which usually contains structures (i.e., large-scale and regular patterns with important visual information), for example, edges and contours.

To identify whether a region is a textured or a non-textured region, a common approach is to use spatial frequency or signal singularity. For example, some existing methods use the distribution of transform coefficients (for example, DCT coefficients) to classify an image block into a smooth region, a textured region and an edge region. However, textured or non-textured regions may both contain low and high spatial frequency sub-bands, and contain unsmooth visual signals. Thus, using spatial frequency or signal singularity to identify a textured region may not be very accurate. Another common approach is to use a local signal variance. However, textured or non-textured regions may both have high signal variances and thus cannot be appropriately distinguished by the variance.

After a textured region is identified, how to simulate the texture masking property, that is, how to adjust the video quality metric according to whether a region is textured or non-textured, is another challenging problem. Some existing methods employ sensitivity constants (for example, Watson's visual mask) observed in visual-psychology experiments to weight distortions to obtain a quality metric. However, such visual-psychology experiments were designed with artificial visual stimuli under simplified viewing conditions, and may not be able to accurately simulate the real conditions for visual quality assessment.

The present principles are directed to the estimation of a texture masking function, which may improve the accuracy of both full-reference and no-reference visual quality metrics.

Figure 2:
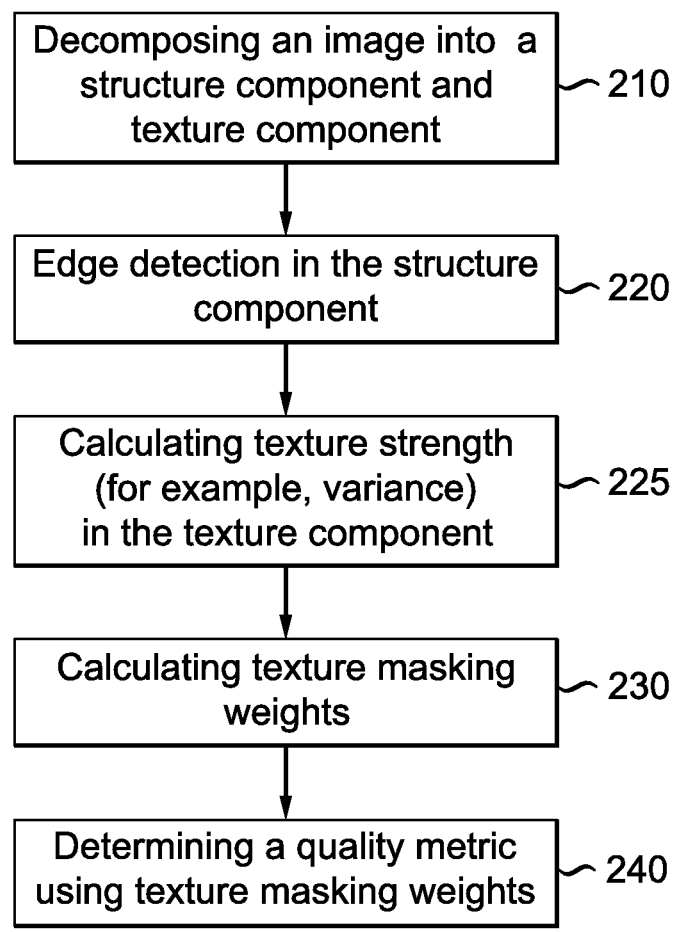
FIG. 2 is a flow diagram depicting an example for calculating a video quality metric, in accordance with an embodiment of the present principles.

FIG. 2 illustrates an exemplary method 200 for using a texture masking function to estimate a video quality metric. At step 210, an image is decomposed into a structure component and a texture component, for example, by a bilateral filter, an anisotropic filter, or total variation regulation. For the structure component, edge detection is performed at step 220 to obtain an edge map. Edge strengths may be determined from edge detection, for example, by a Sobel filter or a Canny edge detector. The edge strengths may be binarized, that is, it determines whether there is an edge or not. For the texture component, texture strengths, for example, measured by variances, are calculated at step 225 to obtain a texture strength map. More generally, texture strengths may be measured by the local statistic moments of the pixel value, or the local statistic moments of the residuals of auto-regression.

Texture masking weights are then estimated at step 230 based on the edge information and the texture strength. In the exemplary embodiments discussed below, the texture masking weight is set to a value between 0 and 1, where 1 means "no change" and thus "no masking." However, the value of the texture masking weight can be easily extended to other ranges. Using the texture masking weighting function, the local distortions may be converted into an overall quality metric at step 240.

In the following, the step of decomposing (210) an image into a structure component and a texture component, the step of calculating (230) texture masking weights, and the step of generating (240) a video quality metric are discussed in further detail.

Decomposing an Image into a Structure Component and a Texture Component

Using a bilateral filter as an example, we discuss how an image may be decomposed into a structure component and a texture component. The principles can be easily extended when other methods are used for decomposition.

To decompose an image I, the bilateral filter may be employed iteratively to process the pixels within a sliding window. Suppose the size of the image is m×m and the size of a sliding window is (2n+1)×(2n+1), the filtering process for a pixel I(x, y) is implemented as follows:

a) Calculate a closeness parameter for each neighboring pixel I(i, j) in the window:

$$G(i,j)=e^{-[(x-i)^2+(y-j)^2]/2\sigma_d^2},$$

where $\sigma_d$ controls the influence of the closeness.

b) Calculate a similarity parameter for each neighboring pixel I(i, j) in the window:

$$H(i,j)=e^{-[I(x,y)-I(i,j)]^2/2\sigma_r^2},$$

while $\sigma_r$ affects the influence of the similarity.

c) Calculate filtering coefficients for each neighboring pixel:

$$F(i,j) = G(i,j)H(i,j) \Big/ \sum_{\substack{|p-x|\leq n, |q-y|\leq n \\ p\leq m, q\leq m}} G(p,q)H(p,q).$$

d) Calculate the structure component S(x,y) by filtering the image:

$$S(x,y) = \sum_{\substack{|p-x|\leq n, |q-y|\leq n \\ p\leq m, q\leq m}} F(p,q)I(p,q). \tag{1}$$

e) Calculate the texture component T(x,y) as a difference between the image and the structure component:

$$T(x,y)=I(x,y)-S(x,y).$$

In one embodiment, n=3, $\sigma_d$=3, and $\sigma_r$=0.03. The values of the parameters may vary with applications, for example, $\sigma_d$ may be adapted to the resolutions of videos, and $\sigma_r$ may be adapted to the bit depth of videos.

Figure 1B:
FIG. 1B is a pictorial example depicting the structure component of the picture.
Figure 1C:
FIG. 1C is a pictorial example depicting the texture component of the picture.

FIGS. 1A-1C provide three exemplary pictures, where FIG. 1A shows an image, FIG. 1B illustrates the structure component of the image of FIG. 1A, and FIG. 1C illustrates the texture component of the image of FIG. 1A.

Calculating Texture Masking Weights

To calculate the texture masking weights, an input picture can be divided into non-overlapping blocks. Most existing video compression standards, for example, H.264 and MPEG-2, use a 16×16 macroblock (MB) as the basic encoding unit. Thus, the following embodiments use a 16×16 block as the basic processing unit. However, the principles may be adapted to use a block at a different size, for example, an 8×8 block, a 16×8 block, a 32×32 block, and a 64×64 block. The present principles can also be extended to use overlapping blocks.

For a block in the texture component, a signal variance can be calculated to estimate the texture strength. In one embodiment, the texture strength is mapped to a range of (0, 1). The luminance channel and/or the chrominance channels may be used to calculate the variance. A texture strength map can be generated using the variances for individual blocks, where the variance of a block corresponds to a sample in the texture strength map. Such a texture strength map based on variances is also referred to as a variance map. As discussed before, other methods can be used to measure texture strength.

The texture strength may be binarized by comparing to a threshold. If texture strength does not exceed the threshold, the corresponding block may be considered as smooth, otherwise the block may be unsmooth.

For the structure component, an edge map may be generated. In one embodiment, the structure component may be down-sampled, for example, by a factor of 16 horizontally and vertically, before edge detection. An edge map is estimated from the down-sampled structure component. Assuming a 3×3 Sobel filter is used for edge detection, the absolute responses of filtered pixel may be added together to represent the edge strength. An edge strength for a block in the original picture corresponds to a sample in the edge map. An edge strength may be mapped to a range of (0, 1).

The edge strength may also be binarized by comparing to a threshold. If the edge strength exceeds the threshold, it indicates that a large-scale edge probably occurs and the corresponding region is labeled as an edge, otherwise the region is labeled as no-edge.

In another embodiment, edge detection may be performed before down-sampling. Usually with down-sampling the edge map should have the same size as the texture strength map. Thus, if the block size for calculating texture strength changes, the down-sampling ratio for calculating the edge map should change accordingly.

The texture strength may then be adjusted by the edge strength. That is, the texture strength and the edge strength are jointly considered to estimate the texture masking weight. We denote a sample in the texture strength map as $T_s(u,v)$ and a sample in the edge map as $E(u,v)$, where u and v are the horizontal and the vertical indexes of each block in the input picture.

When the texture strength map contains binary texture strength information, $$T_s(u, v) = \begin{cases} 0, & \text{smooth} \\ 1, & \text{non-smooth} \end{cases}.$$

When the edge map contains binary edge strength information, $$E(u, v) = \begin{cases} 0, & \text{no-edge} \\ 1, & \text{edge} \end{cases}.$$

Using the edge strength, an adjusted texture strength, $R(u,v)$, may be calculated as:

$$R(u,v) = T_s(u,v) \times [1 - E(u,v)]. \quad (2)$$

That is, the lower the texture strength is or the higher the edge strength is, the lower the adjusted texture strength is. Note that in Eq. (2), $T_s(u,v)$ and $E(u,v)$ are assumed to be within the range of (0, 1). When $T_s(u,v)$ and $E(u,v)$ are set to be in other numerical ranges, Eq. (2) should be adjusted accordingly.

Figure 3A:
FIG. 3A is a pictorial example depicting an edge map.
Figure 3B:
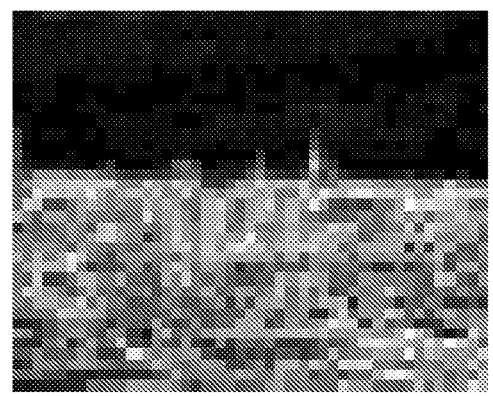
FIG. 3B is a pictorial example depicting a variance map.
Figure 3C:
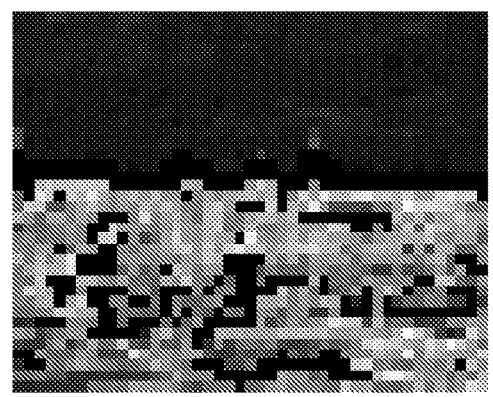
FIG. 3C is a pictorial example depicting a masked variance map, in accordance with an embodiment of the present principles.

FIG. 3A illustrates an exemplary binary edge map, where a white sample represents an edge and a black sample represents no-edge. FIG. 3B illustrates an exemplary variance map, where a brighter sample corresponds to a stronger variance. FIG. 3C illustrates an exemplary masked variance map, where the variance is set to 0 when there is an edge in the edge map.

The block-wise texture masking weight, $W(u,v)$, may then be calculated, for example, as a log-logistic function of the adjusted texture strength $R(u,v)$:

$$W(u, v) = \frac{1}{1 + R(u, v)^c}, \quad (3)$$

where parameter c is a positive real number and can be trained using a subjective database. The log-logistic function maps a positive independent variable to be within a range of (0, 1). For example, when an image region is labeled as an edge in the edge map, the texture masking weight is set to 1. Other functions, such as sigmoid-shape functions (for example, Gompertz function, Ogee curve, generalized logistic function, algebraic curve, arc tangent function, or error function) may be used to map the adjusted texture strength to texture masking weight.

Consequently, the lower the texture strength is or the higher the edge strength is, the higher the texture masking weight is (i.e., less artifacts are considered to be masked in determining the video quality metrics). This is consistent with the texture masking property of human eyes.

Considering a binary texture strength map and a binary edge map, we discuss in further detail how texture masking weights relate to the image content. An individual block may have:

(1) a smooth texture component and no edge in the structure component ($T_s(u,v)=0$, $E(u,v)=0$);

(2) a smooth texture component and edge in the structure component ($T_s(u,v)=0$, $E(u,v)=1$);

(3) a non-smooth texture component and no edge in the structure component ($T_s(u,v)=1$, $E(u,v)=0$); or (4) a non-smooth texture component and edge in the structure component ($T_s(u,v)=1$, $E(u,v)=1$).

The corresponding texture masking weights $W(u,v)$ are shown in TABLE I. That is, when the texture component is smooth or the structure component contains edge, the texture masking weight is calculated to be 1 (i.e., no masking), and when the texture component is non-smooth and there is no edge in the structure component, the texture masking weight is calculated to be 0. As discussed before, artifacts may be masked in a textured area, but not in a non-textured area (for example, a smooth area, or an area with edge). Thus, the calculated texture masking weight for a block is consistent with the corresponding image content, and thus, the texture masking property of the human visual system.

TABLE I

| | $E(u, v) = 0$ (no-edge) | $E(u, v) = 1$ (edge) |
|---|---|---|
| $T_s(u, v) = 0$ (smooth) | 1 (no masking) | 1 (no masking) |
| $T_s(u, v) = 1$ (non-smooth) | 0 (masking) | 1 (no masking) |

By decomposing an image into a texture component and a structure component, the present principles may classify a region as a textured or non-textured region more accurately, and hence simulate the texture masking property of human eyes more closely. In addition to visual quality measurement, the estimated texture masking weights may be used in other applications, for example, in designing a rate control algorithm for video compression.

Generating a Video Quality Metric

Suppose a local distortion is measured at $D(u,v)$, the overall quality metric Q may be calculated as a weighted sum of local distortions:

$$Q = \Sigma_{u,v}[W(u,v) \cdot D(u,v)]. \quad (4)$$

In the following, we discuss an exemplary embodiment where the texture masking weights can be used in estimating video quality metrics for video transmitted over lossy networks.

When an image block is lost during transmission, the block may not be reconstructed properly and may cause visual artifacts. On the other hand, a correctly received inter predicted block which refers to a corrupted block cannot be reconstructed properly either, and thus may cause another type of visual artifact, known as error propagation. To reduce the perceived artifacts, a decoder may try to recover the impaired blocks by error concealment techniques. Visible artifacts may remain in the picture after error concealment.

Some lost blocks may be properly recovered by error concealment and thus hardly affect the perceived video quality. To check whether a lost block is recovered at a sufficiently high quality (i.e., as if the block is correctly received), the pictures are decoded from the bitstream to the pixels, and mosaic artifact are detected on the decoded picture. When mosaic artifacts are detected along block borders, the mosaic artifact strength of the blocks is set to 1. Otherwise it is set to 0 and the block is considered to be properly recovered.

To measure the visual artifacts, a metric without considering the texture masking effect may be calculated as:

$$D_{u,v,t} = MA_{u,v,t}(EC_{u,v,t} + EP_{u,v,t}), \qquad (5)$$

$$Q = \Sigma_{u,v,t} D_{u,v,t} = \Sigma_{u,v,t}[MA_{u,v,t}(EC_{u,v,t} + EP_{u,v,t})], \qquad (6)$$

wherein $D_{u,v,t}$ is distortion at time t at block (u,v), $EC_{u,v,t}$ is a binary value indicating whether a block is lost or not, $EP_{u,v,t}$ is a binary value indicating whether a block is a propagated block, that is, whether the block directly or indirectly uses lost blocks for prediction, and $MA_{u,v,t}$ is a binary value indicating whether the block contains mosaic artifacts along its borders.

Note that the local distortion measurement may be calculated using other methods, for example, as a difference between the original image and the impaired image when the original image is available.

Considering the texture masking property, the metric defined in Eq. (6) can be improved. Specifically, the texture masking function described in Eq. (3) is used to weight the local distortion described in Eq. (5), and the weighted local distortions are pooled together to form the final quality score:

$$Q = \sum_{u,v,t} W(u,v,t) MA_{u,v,t}(EC_{u,v,t} + EP_{u,v,t}) = \qquad (7)$$

$$\sum_{u,v,t} \frac{MA_{u,v,t}(EC_{u,v,t} + EP_{u,v,t})}{1 + R(u,v,t)^c},$$

where W(u,v,t) is the texture masking weight at time t at block (u,v). After training on subjective databases, an exemplary parameter c is set to be between 0.5~1.

The texture masking weights can also be combined into a quality measurement with more complex pooling strategies. For example, a metric can be calculated as:

$$Q = \Sigma_t[\Sigma_{u,v} W(u,v,t) MA_{u,v,t}(EC_{u,v,t} + EP_{u,v,t})]^\gamma,$$

where the local distortions are pooled by two levels of summation. In the inner summation, local distortions within each picture are spatially pooled, while in the outer summation, distortions of each picture power to γ are temporally pooled. γ is a parameter affecting the temporal pooling strategy, an exemplary γ is between 0.6~1.

Figure 4:
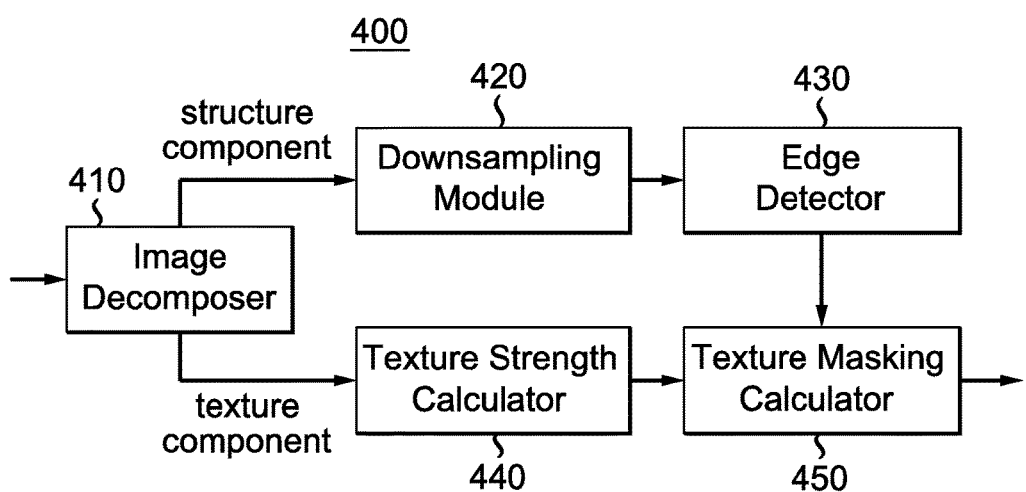
FIG. 4 is a block diagram depicting an example of a texture masking weight calculation apparatus that may be used with one or more implementations of the present principles.

FIG. 4 depicts a block diagram of an exemplary apparatus 400 that may be used to calculate texture masking weights, for example, according to method 200. The input of apparatus 400 includes an image or video.

An image is decomposed by an image decomposer (410) into a structure component and a texture component. The structure component is down-sampled by a down-sampling module (420), and its edge strength is calculated by an edge detector (430). For the texture component, local texture strength is calculated by a texture strength calculator (440), for example, by a variance calculator. Using the edge strength and texture strength, the texture masking weights may be calculated by a texture masking calculator (450), for example, using Eq. (3).

Figure 5:
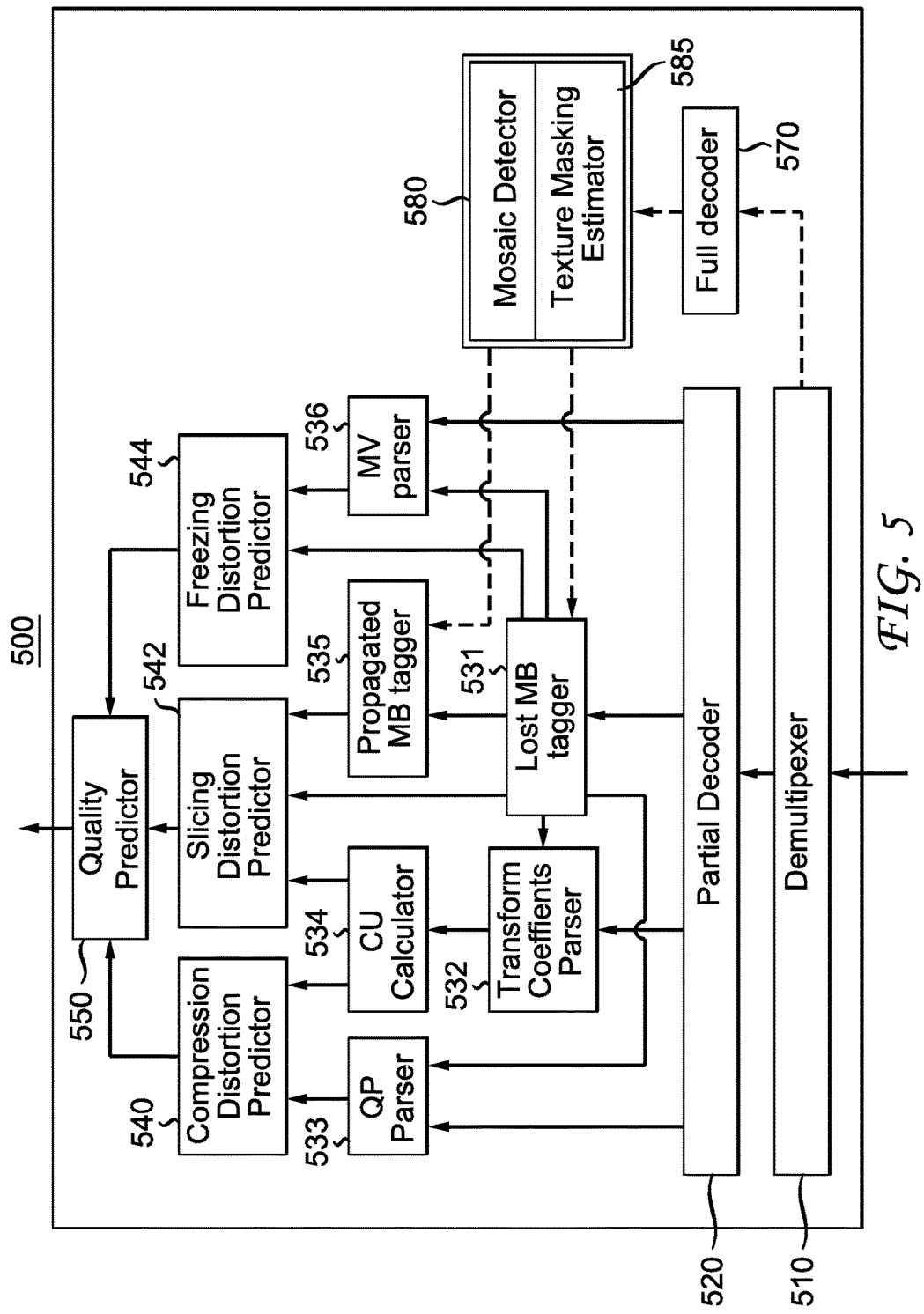
FIG. 5 is a block diagram depicting an example of a video quality measurement apparatus that may be used with one or more implementations of the present principles.

FIG. 5 depicts a block diagram of an exemplary video quality measurement apparatus 500 that can be used to generate a video quality metric for the image. The input of apparatus 500 includes a transport stream that contains the bitstream. The input may be in other formats that contains the bitstream. A receiver at the system level determines packet losses in the received bitstream.

Demultiplexer 510 parses the input stream to obtain the elementary stream or bitstream. It also passes information about packet losses to the decoder 520. The decoder 520 parses necessary information, including QPs, transform coefficients, and motion vectors for each block or macroblock, in order to generate parameters for estimating the quality of the video. The decoder also uses the information about packet losses to determine which macroblocks in the video are lost. Decoder 520 is denoted as a partial decoder to emphasize that full decoding is not performed, i.e., the video is not reconstructed.

Using the MB level QPs parsed from decoder 520, a QP parser 533 obtains average QPs for pictures and for the entire video clip. Using transform coefficients obtained from decoder 520, a transform coefficients parser 532 parses the coefficients and a content unpredictability parameter calculator 534 calculates the content unpredictability parameter for individual pictures and for the entire video clip. Using the information about which macroblocks are lost, a lost MB tagger 531 marks which MB is lost. Further using motion information, a propagated MB tagger 535 marks which MBs directly or indirectly use the lost blocks for prediction (i.e., which blocks are affected by error propagation). Using motion vectors for blocks, an MV parser 536 calculates average motion vectors for MBs, pictures, and the entire video clip. Other modules (not shown) may be used to determine error concealment distances, durations of freezing, and frame rates.

A compression distortion predictor 540 estimates the compression distortion factor, a slicing distortion predictor 542 estimates the slicing distortion factor, and a freezing distortion predictor 544 estimates the freezing distortion factor. Based on the estimated distortion factors, a quality predictor 550 estimates an overall video quality metric.

When extra computation is allowed, a decoder 570 decodes the pictures. The decoder 570 is denoted as a full decoder and it will reconstruct the pictures and perform error concealment if necessary. A mosaic detector 580 performs mosaic detection on the reconstructed video. Using the mosaic detection results, the lost MB tagger 531 and the propagated MB tagger 535 update relevant parameters, for example, the lost block flag and the propagated block flag.

A texture masking estimator 585 calculates texture masking weights. Apparatus 400 may be used as a texture masking estimator. The texture masking weights can be used to weigh the distortions.

Figure 6:
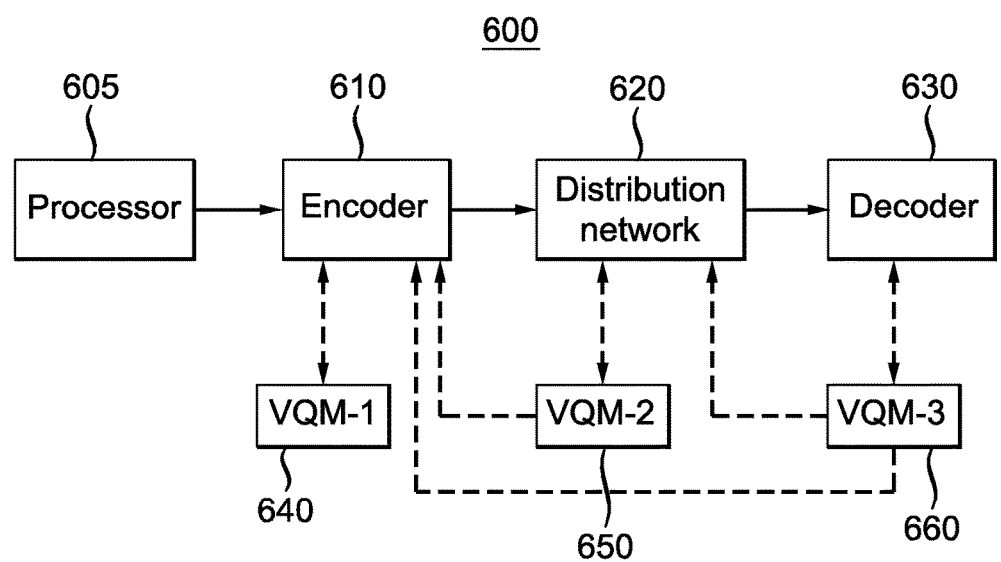
FIG. 6 is block diagram depicting an example of a video processing system that may be used with one or more implementations of the present principles.

Referring to FIG. 6, a video transmission system or apparatus 600 is shown, to which the features and principles described above may be applied. A processor 605 processes the video and the encoder 610 encodes the video. The bitstream generated from the encoder is transmitted to a decoder 630 through a distribution network 620. A video quality monitor or a video quality measurement apparatus, for example, the apparatus 500, may be used at different stages.

In one embodiment, a video quality monitor 640 may be used by a content creator. For example, the estimated video quality may be used by an encoder in deciding encoding parameters, such as mode decision or bit rate allocation. In another example, after the video is encoded, the content creator uses the video quality monitor to monitor the quality of encoded video. If the quality metric does not meet a pre-defined quality level, the content creator may choose to re-encode the video to improve the video quality. The content creator may also rank the encoded video based on the quality and charges the content accordingly.

In another embodiment, a video quality monitor 650 may be used by a content distributor. A video quality monitor may be placed in the distribution network. The video quality monitor calculates the quality metrics and reports them to the content distributor. Based on the feedback from the video quality monitor, a content distributor may improve its service by adjusting bandwidth allocation and access control.

The content distributor may also send the feedback to the content creator to adjust encoding. Note that improving encoding quality at the encoder may not necessarily improve the quality at the decoder side since a high quality encoded video usually requires more bandwidth and leaves less bandwidth for transmission protection. Thus, to reach an optimal quality at the decoder, a balance between the encoding bitrate and the bandwidth for channel protection should be considered.

In another embodiment, a video quality monitor 660 may be used by a user device. For example, when a user device searches videos in Internet, a search result may return many videos or many links to videos corresponding to the requested video content. The videos in the search results may have different quality levels. A video quality monitor can calculate quality metrics for these videos and decide to select which video to store. In another example, the decoder estimates qualities of concealed videos with respect to different error concealment modes. Based on the estimation, an error concealment that provides a better concealment quality may be selected by the decoder.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for estimating video quality, comprising:
   accessing image data having at least one image region;
   decomposing the image region into a structure component and a texture component;
   determining an edge strength for the structure component of the image region;
   determining a texture masking weight in response to the edge strength,
   wherein the texture masking weight is set such that no texture masking property is used when the edge strength exceeds a threshold,
   wherein the texture masking weight is determined responsive to a texture strength for the texture component of the image region when the edge strength does not exceed the threshold, and
   wherein the texture masking weight is set such that no texture masking property is used when the texture strength of the texture component of the image region does not exceed a second threshold; and
   determining a quality metric in response to a local distortion of the image region weighted by the texture masking weight.

2. The method of claim 1, wherein a bilateral filter is used to decompose the image region into the structure component and the texture component.

3. The method of claim 1, wherein the texture strength is determined as a variance of the texture component of the image region.

4. The method of claim 1, wherein the image data comprises a plurality of image regions, the decomposing, determining the edge strength and determining the texture masking weight comprise decomposing, determining respective edge strengths and determining respective texture masking weights for the plurality of image regions, and wherein the quality metric is determined in response to a combination of the weighted local distortions for the plurality of image regions.

5. An apparatus for estimating video quality, comprising at least one memory and one or more processors, wherein the one or more processors are configured to:
   access image data having at least one image region;
   decompose an image region into a structure component and a texture component;
   determine an edge strength for the structure component of the image region;
   determine a texture masking weight in response to the edge strength,
   wherein the texture masking weight is set such that no texture masking is used when the edge strength exceeds a threshold,
   wherein the texture masking weight is determined responsive to a texture strength for the texture component of the image region when the edge strength does not exceed the threshold, and
   wherein the texture masking weight is set such that no texture masking property is used when the texture strength of the texture component of the image region does not exceed a second threshold; and
   determine a quality metric in response to a local distortion of the image region weighted by the texture masking weight.

6. The apparatus of claim 5, wherein a bilateral filter is used to decompose the image region into the structure component and the texture component.

7. The apparatus of claim 5, wherein the texture strength is determined as a variance of the texture component of the image region.

8. The apparatus of claim 5, wherein the image data comprises a plurality of image regions, the one or more processors are configured to respectively decompose, determine respective edge strengths and determine respective texture masking weights for the plurality of image regions, and determine the quality metric in response to a combination of the weighted local distortions for the plurality of image regions.

9. A non-transitory processor readable medium having stored thereupon instructions for causing one or more processors to collectively perform:
   decomposing an image region into a structure component and a texture component;
   determining an edge strength for the structure component of the image region;
   determining a texture masking weight in response to the edge strength,
   wherein the texture masking weight is set such that no texture masking is used when the edge strength exceeds a threshold,
   wherein the texture masking weight is determined responsive to a texture strength for the texture component of the image region when the edge strength does not exceed the threshold, and
   wherein the texture masking weight is set such that no texture masking property is used when the texture strength of the texture component of the image region does not exceed a second threshold; and
   determining a quality metric in response to a local distortion of the image region weighted by the texture masking weight.

* * * * *